(12) United States Patent
Riittinen (10) Patent No.: US 7,814,313 B2
(45) Date of Patent: Oct. 12, 2010

(54) SYSTEM, TERMINAL, NETWORK ENTITY, METHOD AND COMPUTER PROGRAM PRODUCT FOR AUTHORIZING COMMUNICATION MESSAGE

(75) Inventor: Heikki Riittinen, Helsinki (FI)

(73) Assignee: Nokia Corporation, Espoo (FI)

( * ) Notice: Subject to any disclaimer, the term of this patent is extended or adjusted under 35 U.S.C. 154(b) by 1158 days.

(21) Appl. No.: 11/169,376

(22) Filed: Jun. 29, 2005

(65) Prior Publication Data

US 2007/0005976 A1    Jan. 4, 2007

(51) Int. Cl.
  *H04L 9/30*   (2006.01)
  *H04L 29/06*  (2006.01)

(52) U.S. Cl. .......................... 713/157; 726/4

(58) Field of Classification Search ......... 713/155–157, 713/171, 173, 175
  See application file for complete search history.

(56) References Cited

U.S. PATENT DOCUMENTS

| | | | |
|---|---|---|---|
| 5,903,882 A * | 5/1999 | Asay et al. ................... 705/44 |
| 6,189,096 B1 * | 2/2001 | Haverty .................... 713/155 |
| 2002/0013899 A1 * | 1/2002 | Faul .......................... 713/156 |
| 2004/0205135 A1 | 10/2004 | Hallam-Baker | |
| 2005/0033958 A1 * | 2/2005 | Connell ..................... 713/156 |
| 2005/0039019 A1 | 2/2005 | Delany | |
| 2005/0086504 A1 * | 4/2005 | You et al. .................. 713/193 |
| 2005/0091541 A1 * | 4/2005 | Peinado et al. ............. 713/201 |
| 2005/0144239 A1 | 6/2005 | Mattathil | |
| 2005/0172004 A1 | 8/2005 | Fisher | |
| 2005/0177715 A1 * | 8/2005 | Somin et al. ................. 713/156 |

FOREIGN PATENT DOCUMENTS

| | | |
|---|---|---|
| EP | 1675057 A1 | 6/2006 |
| RU | 2 384 003 C2 | 3/2010 |
| WO | WO 2005001660 A2 | 1/2006 |

OTHER PUBLICATIONS

Mexican Office action for corresponding MX patent app. No. MX/a/2007/013933 dated Jul. 30, 2010, pp. 1-3.

* cited by examiner

*Primary Examiner*—Gilberto Barron, Jr.
*Assistant Examiner*—Venkat Perungavoor
(74) *Attorney, Agent, or Firm*—Ditthavong Mori & Steiner, P.C.

(57) ABSTRACT

A system, terminal, method, and computer program product use a capability certificate to authorize a sender to send a communication message to a recipient, such that the recipient can quickly and easily determine whether to receive the message. In this regard, a system for controlling receipt of a communication message by a recipient comprises a sending terminal and a receiving terminal. The sending terminal may be capable of sending the communication message from a sender. The receiving terminal may be capable of determining if the communication message is cryptographically bound to a capability certificate, such that the receiving terminal receives the communication message if the communication message is cryptographically bound to the capability certificate. Determining if the communication message is cryptographically bound to a capability certificate may comprise determining if the communication message is signed by the sender using a private encryption key of the sender.

14 Claims, 6 Drawing Sheets

SYSTEM, TERMINAL, NETWORK ENTITY, METHOD AND COMPUTER PROGRAM PRODUCT FOR AUTHORIZING COMMUNICATION MESSAGE

FIELD OF THE INVENTION

Embodiments of the invention generally relate to messaging and, more particularly, relates to authorizing messages to prevent unwanted messages.

BACKGROUND OF THE INVENTION

Many devices, such as mobile telephones, personal computers (PCs), handheld computers, and personal digital assistants (PDAs), enable users of such devices to send and receive communication messages using a variety of electronic communication methods. For example, communication messages may be sent and received using email, instant messaging (IM), text messaging (also called short messaging service or SMS), and voice over internet protocol (VOIP).

Having the ability to communicate using these communication methods is very useful and efficient. However, the usefulness and efficiency of such communication methods is often reduced because of unwanted and undesirable messages. (Such messages may be termed "spam." While the term "spam" is typically used to refer to unwanted and undesirable email messages, the term "spam" will be used herein to refer to unwanted and undesirable messages sent via any communication method.) Users may receive a large amount of spam. Users may spend a large amount of time sorting through received messages and deleting unwanted messages. Additionally, some communication messages may contain content that is inappropriate for young users.

Users may wish to prevent spam from being delivered to the user. Alternatively, users may wish to segregate messages that may be spam into a separate category or folder to facilitate deletion of messages that are spam. Some methods exist which attempt to prevent spam from reaching the user. One method is to search each incoming communication message for a predefined list of words or phrases that may be indicative of spam. This method may be termed the "keyword method." If a word or phrase from the predefined list is found in the communication message, the communication message may not be delivered to the user. The keyword method may not prevent all spam, however, because senders of spam may be able to circumvent such a method. One way to circumvent the keyword method is to avoid using any words or phrases from the predefined list in the message. Senders of spam may, for example, deliberately misspell a word in the message that is on the predefined list. Such a misspelling may cause the keyword method to fail and allow the message to be delivered to the user.

Another method of preventing spam is to compare the communication identifier (e.g., email address, IM screen name, telephone number) of the sender to a predefined list of authorized senders. Such a list may be termed a "white list," and the method may be termed the "white list method." If the sender's communication identifier is not on the predefined white list, then the communication message may not be delivered to the user. One drawback of the white list method, however, is that the list of authorized users must be frequently updated to ensure that desired messages are delivered. Additionally, the white lists consume memory storage space, typically either in the user's communication device or in a network device, such as an email server.

BRIEF SUMMARY OF THE INVENTION

A system, terminal, method, and computer program product are therefore provided that use a capability certificate to authorize a sender to send a communication message to a recipient, such that the recipient can quickly and easily determine whether to receive the message by the presence or absence of the capability certificate. In this regard, a system for controlling receipt of a communication message by a recipient comprises a sending terminal and a receiving terminal. The sending terminal may be capable of sending the communication message from a sender. The receiving terminal may be capable of determining if the communication message is cryptographically bound to a capability certificate, such that the receiving terminal receives the communication message if the communication message is cryptographically bound to the capability certificate. Determining if the communication message is cryptographically bound to a capability certificate may comprise determining if the communication message is signed by the sender using a private encryption key of the sender.

In one embodiment, the receiving terminal is further capable of determining if the capability certificate is signed using a private encryption key by at least one of the recipient and a trusted party, such that the receiving terminal receives the communication message if the capability certificate is signed using the private encryption key by at least one of the recipient and the trusted party.

The capability certificate may be a first capability certificate. The receiving terminal may be further capable of determining if the communication message is cryptographically bound to a second capability certificate. The receiving terminal may be further capable of determining if an unbroken link exists between the second capability certificate and the first capability certificate signed by at least one of the recipient and the trusted party. As such, the receiving terminal may receive the communication message if the communication message is cryptographically bound to the second capability certificate and if the unbroken link exists between the second capability certificate and the first capability certificate signed by at least one of the recipient and the trusted party.

In one embodiment, the receiving terminal is further capable of determining if a signer of any capability certificate in the communication message is listed on a blacklist.

In another embodiment, the receiving terminal is further capable of receiving an authorization request from the sending terminal, the authorization request signed by the sender using a private encryption key of the sender and defining a communication identifier of the recipient, a communication identifier of the sender, and a public key of the sender. The receiving terminal is further capable of sending the capability certificate to the sending terminal in response to the authorization request, the capability certificate signed by the recipient using a private encryption key of the recipient and defining the communication identifier of the recipient and the communication identifier of the sender.

The capability certificate may further define a forwarding authorization that indicates whether the sender is authorized to sign a capability certificate of a second sender such that the recipient will receive a communication message sent from the second sender.

In addition to the system for controlling receipt of a communication message described above, other aspects of the invention are directed to corresponding terminals, network entities, methods, and computer program products for controlling receipt of a communication message.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention will be primarily described in conjunction with email communications. It should be understood, however, that embodiments of the invention can be utilized in conjunction with a variety of other communication applications, such as instant messaging (IM), short messaging service (SMS), Multimedia Messaging Service (MMS), and voice over internet protocol (VOIP). Additionally, embodiments of the invention will be primarily described in conjunction with mobile communications applications, and in particular mobile telephones. It should be understood, however, that embodiments of the invention can be utilized in conjunction with a variety of other applications, both in the mobile communications industries and outside of the mobile communications industries. For example, embodiments of the invention can be utilized in conjunction with wireline and/or wireless network (e.g., Internet) applications. Additionally, embodiments of the invention can be utilized in conjunction with any other devices capable of executing a communication application, including but not limited to personal computers, laptop computers, handheld computers, and personal digital assistants.

Additionally, embodiments of the invention use a capability certificate to indicate whether a particular communication message from a particular sender is authorized and should be received by the recipient. A capability certificate is typically an unforgeable token that grants the holder of the certificate (e.g., the sender) the right to use or access a resource. A capability certificate typically contains the resource and the specific rights granted to the holder. A capability certificate may contain the identity of the holder. A capability certificate typically contains the public key of the holder. The holder may use the public key to verify the holder's authority to use the certificate by proving that the holder has possession of the corresponding private key. A capability certificate typically contains the identity and public key of the entity granting the right to the resource. The owner of the communication identifier where a communication message is to be sent (i.e., the recipient) may send a capability certificate to those senders that the recipient is authorizing to send communication messages to the recipient. The capability certificate may also include permission to the sender to grant permission to send communication messages to the recipient. The owner of the communication identifier may also keep a black list of those senders that have misused the recipient's communication identifier by sending unwanted messages or by granting permission to other senders that have sent unwanted messages.

Embodiments of the invention will also be primarily described in conjunction with asymmetric encryption algorithms, such as public key infrastructure (PKI). It should be understood, however, that embodiments of the invention can be utilized in conjunction with a variety of other encryption algorithms.

Figure 1:
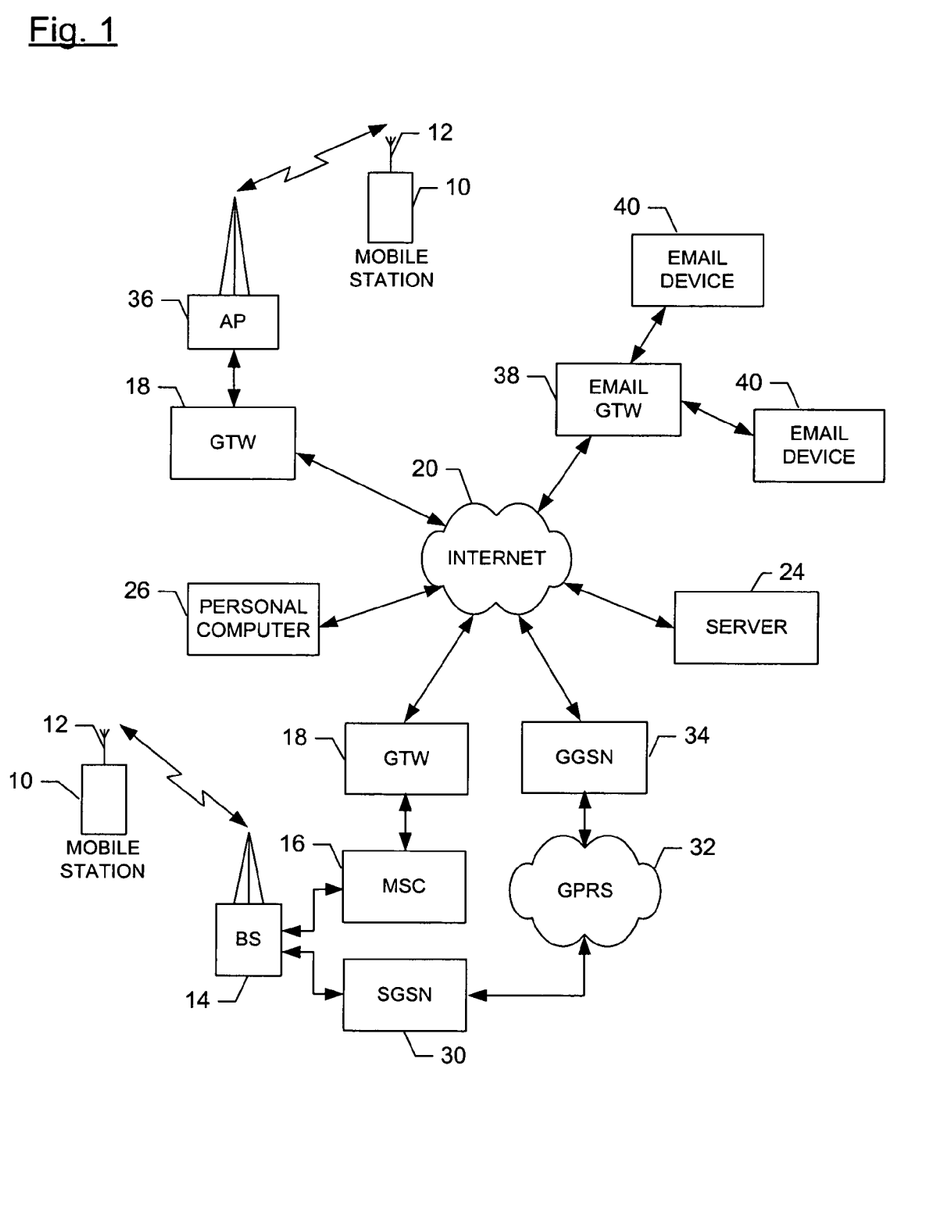
FIG. 1 is a block diagram of one type of system that would benefit from embodiments of the invention.

As shown in FIG. 1 by way of example, an illustration of one type of system that would benefit from the invention is provided. The system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a gateway (GTW) 18, and the GTW is coupled to a WAN, such as the Internet 20. In turn, devices such as processing elements (e.g., personal computers, server computers or the like) can be coupled to the mobile station 10 via the Internet. For example, as explained below, the processing elements can include one or more processing elements associated with one or more servers 24, personal computer (PC) systems 26, or the like, one of each being illustrated in FIG. 1 and described below. As will be appreciated, the processing elements can comprise any of a number of processing devices, systems or the like capable of operating in accordance with embodiments of the invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the invention, as should dual or higher mode mobile stations (e.g., digital/analog or TDMA/CDMA/analog phones).

One or more mobile stations 10 can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 14, the AP's can be directly coupled to the Internet. In one embodiment, however, the APs are indirectly coupled to the Internet via a GTW 18. As will be appreciated, by directly or indirectly connecting the mobile stations and the processing elements (e.g., servers 24, personal computer (PC) systems 26) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the invention. Thus, use of any such terms should not be taken to limit the spirit and scope of the invention.

Communication between and among the mobile stations and other communication devices may be routed through a communication gateway or router, such as email gateway 38. Such a gateway may function as a single point of receipt for communication messages directed to many different devices, such as email device 40, such that the gateway may perform defined operations on each message and then direct each message to the appropriate communication device. For example, email gateway 38 may scan incoming emails for viruses before directing the emails to the appropriate email device.

Although not shown in FIG. 1, in addition to or in lieu of coupling the mobile stations 10 to servers 24, personal computer (PC) systems 26 and the like across the Internet 20, one or more such entities may be directly coupled to one another. As such, one or more network entities may communicate with one another in accordance with, for example, RF, BT, IrDA or any of a number of different wireline or wireless communication techniques, including LAN and/or WLAN techniques.

As will be appreciated, a number of the entities of the system of FIG. 1 can be configured in any of a number of different architectures to perform any of a number of functions. For example, the entities of the system of FIG. 1 can be configured in a centralized client-server architecture, decentralized architecture and/or proxy architecture. Additionally or alternatively, for example, the entities of the system of FIG. 1 can be configured in an architecture given in the Scalable Network Application Package (SNAP) (formerly Sega Network Application Package) provided by Nokia Corporation for applications such as in the context of gaming.

Figure 2:
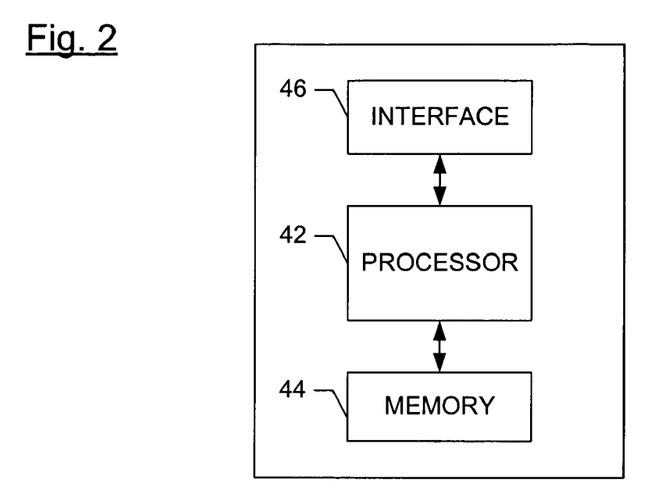
FIG. 2 is a schematic block diagram of an entity capable of operating as a mobile station, terminal, and/or network entity, in accordance with embodiments of the invention.

Referring now to FIG. 2, a block diagram of an entity capable of operating as a mobile station, terminal, and/or network entity (e.g., server, email gateway) is shown in accordance with one embodiment of the invention. The entity capable of operating as a mobile station, terminal, and/or network entity includes various means for performing one or more functions in accordance with exemplary embodiments of the invention, including those more particularly shown and described herein. It should be understood, however, that one or more of the entities may include alternative means for performing one or more like functions, without departing from the spirit and scope of the invention. More particularly, for example, as shown in FIG. 2, the entity can generally include means, such as a processor 42, controller or the like, connected to a memory 44 for performing or controlling the various functions of the entity. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with embodiments of the invention. As explained below, for example, the memory can store client application(s) including a configuration utility, content manager and/or display manager. In this regard, when executed, the configuration utility may function to configure a source of content to receive or otherwise provide content. The content manager, when executed, may function to manage the receipt of content from the source, and/or the use of content received from the source. And the display manager may function to manage presentation of content received from the source. As described herein, the client application(s) each comprise software operated by the respective entities. It should be understood, however, that any one or more of the client applications described herein can alternatively comprise firmware or hardware, without departing from the spirit and scope of the invention.

In addition to the memory 44, the processor 42 can also be connected to at least one interface 46 or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

Figure 3:
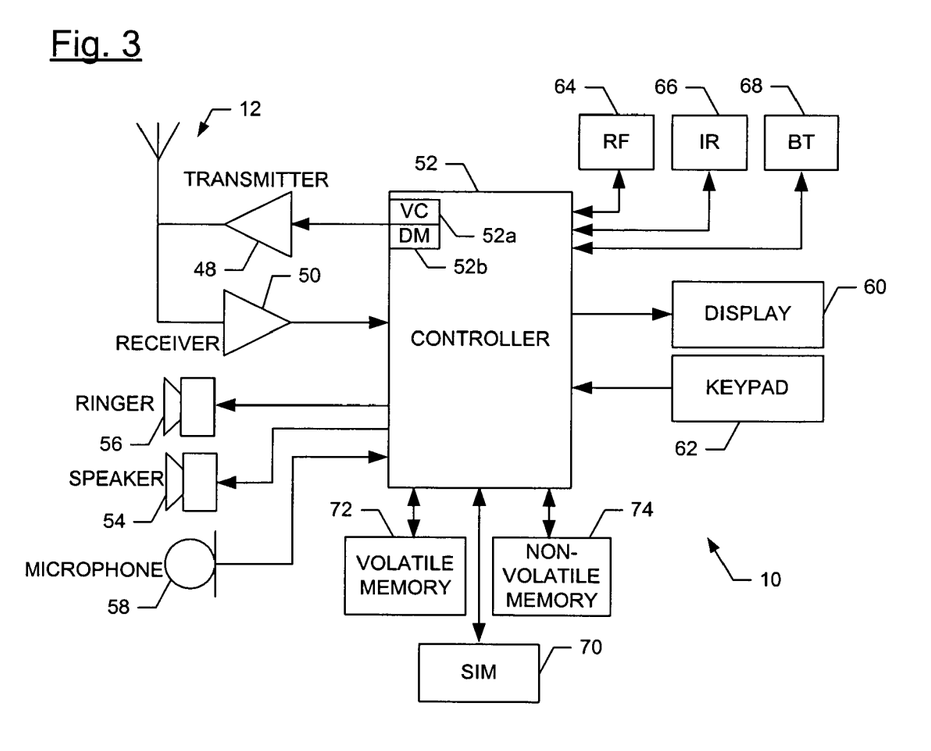
FIG. 3 is a schematic block diagram more particularly illustrating a mobile station in accordance with one embodiment of the invention.

Reference is now made to FIG. 3, which illustrates one type of terminal or mobile station 10, a mobile telephone, which would benefit from embodiments of the invention. It should be understood, however, that the mobile station illustrated and hereinafter described is merely illustrative of one type of mobile station that would benefit from the invention and, therefore, should not be taken to limit the scope of the invention. While several embodiments of the mobile station are illustrated and will be hereinafter described for purposes of example, other types of mobile stations, such as portable digital assistants (PDAs), two-way pagers, laptop computers, handheld computers and other types of electronic systems, can readily employ the invention. Additionally, it should be appreciated that terminals other than mobiles stations, such as personal computers, can readily employ the invention.

The terminal 10 includes various means for performing one or more functions in accordance with exemplary embodiments of the invention, including those more particularly shown and described herein. It should be understood, however, that the terminal may include alternative means for performing one or more like functions, without departing from the spirit and scope of the invention. More particularly, for example, as shown in FIG. 3, in addition to an antenna 12, the mobile station 10 can include a transmitter 48, receiver 50, and means, such as a processing device, e.g., a controller 52, processor or the like, that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, EDGE, or the like. Further, for example, the mobile station may be capable of operating in accordance with 3G wireless communication protocols such as UMTS network employing WCDMA radio access technology. Some NAMPS, as well as TACS, mobile stations may also benefit from the teaching of this invention, as should dual or higher mode phones (e.g., digital/analog or TDMA/CDMA/analog phones).

It is understood that the controller 52 includes the circuitry required for implementing the audio and logic functions of the mobile station 10. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 52a, and may include an internal data modem (DM) 52b. Further, the controller may include the functionality to operate one or more client software programs such as those indicated above, which may be stored in memory (described below).

The mobile station 10 also comprises a user interface including a conventional earphone or speaker 54, a ringer 56, a microphone 58, a display 60, and a user input interface, all of which are coupled to the controller 52. Although not shown, the mobile station can include a battery for powering the various circuits that are required to operate the mobile station, as well as optionally providing mechanical vibration as a detectable output. The user input interface, which allows the mobile station to receive data, can comprise any of a number of devices allowing the mobile station to receive data, such as a keypad 62, a touch display (not shown), a joystick (not shown) or other input device. In embodiments including a keypad, the keypad includes the conventional numeric (0-9) and related keys (#, *), and other keys used for operating the mobile station. For instant messaging applications, the keypad 62 may include a full QWERTY or other alphanumeric keyboard.

The mobile station 10 can also include one or more means for sharing and/or obtaining data. For example, the mobile station can include a short-range radio frequency (RF) transceiver or interrogator 64 so that data can be shared with and/or obtained from electronic devices in accordance with RF techniques. The mobile station can additionally, or alternatively, include other short-range transceivers, such as, for example an infrared (IR) transceiver 66, and/or a Bluetooth (BT) transceiver 68 operating using Bluetooth brand wireless technology developed by the Bluetooth Special Interest Group. The mobile station can therefore additionally or alternatively be capable of transmitting data to and/or receiving data from electronic devices in accordance with such techniques. Although not shown, the mobile station can additionally or alternatively be capable of transmitting and/or receiving data from electronic devices according to a number of different wireless networking techniques, including WLAN techniques such as IEEE 802.11 techniques or the like.

The mobile station 10 can further include memory, such as a subscriber identity module (SIM) 70, a removable user identity module (R-UIM) or the like, which typically stores information elements related to a mobile subscriber. In addition to the SIM, the mobile station can include other removable and/or fixed memory. In this regard, the mobile station can include volatile memory 72, such as volatile Random Access Memory (RAM) including a cache area for the temporary storage of data. The mobile station can also include other non-volatile memory 74, which can be embedded and/or may be removable. The non-volatile memory can additionally or alternatively comprise an EEPROM, flash memory or the like. The memories can store any of a number of software applications, instructions, pieces of information, and data, used by the mobile station to implement the functions of the mobile station.

Figure 4:
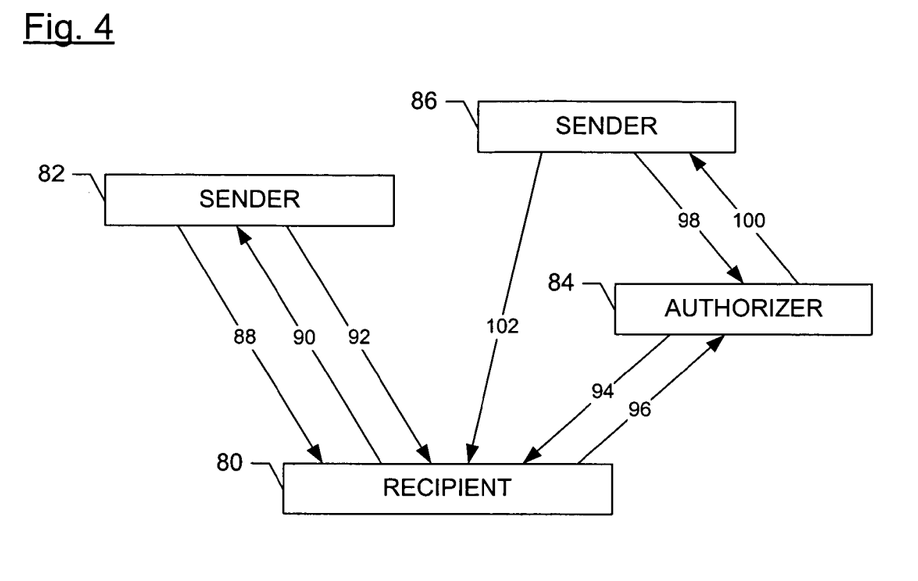
FIG. 4 is a functional block diagram illustrating the operation of controlling receipt of a communication message by a recipient, in accordance with one embodiment of the invention.

Reference is now made to FIG. 4, which illustrates the operation of controlling receipt of a communication message by a recipient, in accordance with one embodiment of the invention. When a sender, such as sender 82 or sender 86, wants to send a "trusted" communication message to a recipient 80 having a particular communication identifier, the sender would typically request an capability certificate corresponding to that communication identifier. The request may be sent to the owner of that communication identifier (i.e., the recipient 80), as illustrated by line 88, or someone who has right to grant permission for that communication identifier (a person or entity who has the right to grant permission for someone else may be termed an authorizer 84), as illustrated by line 98. The person or entity granting permission (i.e., the recipient 80 or authorizer 84) would typically authenticate the sender before granting permission. Authentication generally involves determining whether the sender is likely to send unwanted communication messages. The authentication is typically performed manually, such that the sender may be authenticated if the sender is a friend or business associate of the recipient or authorizer, however any suitable authentication method may be used. If the sender is authenticated, the recipient or authorizer would then typically send a capability certificate attached to or embedded in a communication message sent to the sender/requester. Line 90 illustrates the recipient 80 sending the certificate to sender 82, and line 100 illustrates the authorizer 84 sending the certificate to sender 86 (as discussed in detail below). If it is the recipient who is authorizing the sender, the recipient would typically send a capability certificate (see, for example, 126 of FIG. 7) that includes the sender's communication identifier (134 of FIG. 7), the sender's public encryption key (132 of FIG. 7), and the recipient's communication identifier (130 of FIG. 7). The certificate would typically be signed by the recipient using the recipient's private encryption key (128 of FIG. 7).

In order for the authorizer 84 to be able to authorize the sender 86 to send messages to the recipient 80, the authorizer typically will send a request (illustrated by line 94 of FIG. 4) to the recipient requesting a capability certificate that gives the authorizer the ability to authorize other senders to send messages. If the recipient is willing to allow the authorizer such permission, the recipient would typically send a capability certificate to the authorizer, as illustrated by line 96. The certificate that the authorizer receives from the recipient would typically include the authorizer's communication identifier, the authorizer's public encryption key, and the recipient's communication identifier. The certificate would typically be signed by the recipient using the recipient's private encryption key. The certificate would typically have an indication that the authorizer has the recipient's permission for the authorizer to authorize another person (i.e., the sender in this example) to send communication messages to the recipient. Such a capability certificate would also typically authorize the authorizer to send messages to the recipient.

If it is the authorizer who is authorizing the sender, the authorizer would typically send (as illustrated by line 100) to the sender 86 a capability certificate created by the authorizer that includes the sender's communication identifier, the sender's public encryption key, and the authorizer's communication identifier. The capability certificate created by the authorizer would typically be attached to or embedded in a communication message sent from the authorizer to the sender. The certificate would typically be signed by the authorizer using the authorizer's private encryption key. Additionally, the authorizer would send to the sender the capability certificate that the authorizer received from the recipient. The capability certificate that the authorizer received from the recipient may be separately attached to or embedded in the authorizer's communication message to the sender, or alternatively may be attached to or embedded together with the capability certificate created by the authorizer in the authorizer's communication message to the sender.

After the sender has received a capability certificate, the sender may then send a communication message to the recipient. The sender 82 that received the capability certificate directly from the recipient 80 would typically cryptographically bind that certificate to the message, as illustrated by line 92. It should be appreciated that the trusted message (i.e., the message from the sender to the recipient) would typically have a capability certificate that is cryptographically bound to the message, whereas in the original transmission of the capability certificate from the recipient or the authorizer to the sender the certificate would typically be attached to or embedded in the message. The sender 86 that received the capability certificates from the authorizer 84 would typically cryptographically bind the certificate created by the authorizer to the message and attach or embed the certificate created by the recipient to the message, as illustrated by line 102. The capability certificate may be cryptographically bound to the trusted communication message using any known technique. For example, if the communication message is an email message, the Secure/Multipurpose Internet Mail Extensions (S/MIME) standard may be used. Other encryption techniques may be used, including public key encryption such as Public Key Infrastructure (PKI) and Pretty Good Protection (PGP). (PGP is a trademark of PGP Corporation.) As such, the sender may cryptographically bind the certificate by signing the message using the sender's private encryption key. Binding the certificate to the communication message using a cryptographic technique enables the recipient to verify that the message was sent from an authorized sender. If the sender knows that the recipient already has one or more of the certificates, the size of the communication message may be reduced by leaving out one or more of the authorizer certificates. Before the sender's communication message is received by the recipient, the recipient would typically verify that the communication message is from an authorized sender, as discussed in detail below.

Although not illustrated in FIG. 4, in addition to authorizing senders, an authorizer may authorize other authorizers. That is, an authorizer who has the recipient's permission to authorize another person to send communication messages to the recipient may also have the authority to grant the same permission to others. This may be accomplished by having the first authorizer (i.e., the authorizer who received the certificate from the recipient) create and send a certificate with the same indication of permission that was in the certificate received by the first authorizer, thereby indicating that the second authorizer has the recipient's permission to authorize another person to send communication messages to the recipient. Alternatively, the indication in the certificate created by the recipient may indicate one of three different permission levels: (1) the certificate may only be used to send messages to the recipient and may not be used to grant permission to other parties to send messages to the recipient; (2) the certificate may be used to grant permission to other parties such that the other parties may send messages to the recipient, but may not authorize the other parties to authorize additional parties; and (3) the certificate may be used to grant permission to other parties such that the other parties may authorize additional parties to send messages to the recipient. The certificate with permission level (1) would typically be sent from a recipient to a sender. The certificate with permission level (2) would typically be sent from a recipient to an authorizer, who may then send the certificate to a sender. The certificate with permission level (3) would typically be sent from a recipient to an authorizer, who may then send the certificate to another authorizer.

Figure 5:
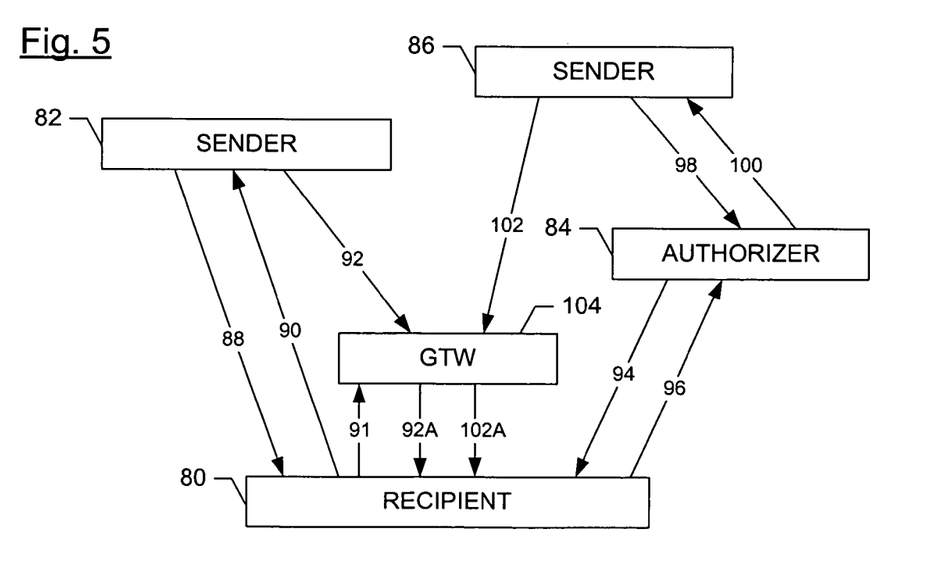
FIG. 5 is a functional block diagram illustrating the operation of controlling receipt of a communication message by a recipient via a gateway, in accordance with one embodiment of the invention.

Reference is now made to FIG. 5, which illustrates the operation of controlling receipt of a communication message by a recipient via a gateway, in accordance with one embodiment of the invention. The operation of the embodiment illustrated in FIG. 5 is similar to that of the embodiment illustrated in FIG. 4, however in the embodiment of FIG. 5 the communication messages 92, 102 from the senders are typically routed through a gateway 104. The gateway 104 typically verifies that the messages are from authorized senders, rather than the recipient verifying the messages as in the embodiment of FIG. 4. In order for the gateway to be able to verify that the communication messages are from authorized senders, the recipient will typically send a capability certificate to the gateway that includes the recipient's communication identifier and public key. This capability certificate would typically only need to be sent one time from the recipient to the gateway to enable the gateway to verify communication messages for that particular recipient. In one exemplary embodiment, the capability certificate may have an expiration date, such that the recipient would typically need to send a new, unexpired certificate to the gateway when the previously sent certificate has expired. The recipient would typically send the certificate to the gateway before or at about the same time that the recipient sends a capability certificate to the sender or authorizer in response to a request. For example, before the recipient 80 sends a capability certificate, illustrated by line 90, to the sender 82, the recipient will typically also send a capability certificate, illustrated by line 91, to the gateway 104. Similarly, before the recipient 80 sends a capability certificate, illustrated by line 96, to the authorizer 84, the recipient will typically have sent capability certificate 91 to the gateway 104. As discussed above, capability certificate 91 would typically only need to be sent one time to the gateway to enable the gateway to verify messages from any sender to recipient 80. When the gateway receives messages 92, 102 from senders 82, 86 respectively, the gateway will typically use the information in capability certificate 91 to verify that messages 92, 102 are from authorized users. If the gateway is able to verify messages 92, 102, the gateway would then typically deliver the messages to the recipient, as illustrated by lines 92A, 102A. Although not illustrated in FIG. 5, the gateway may receive and verify incoming messages for many different recipients.

Figure 6:
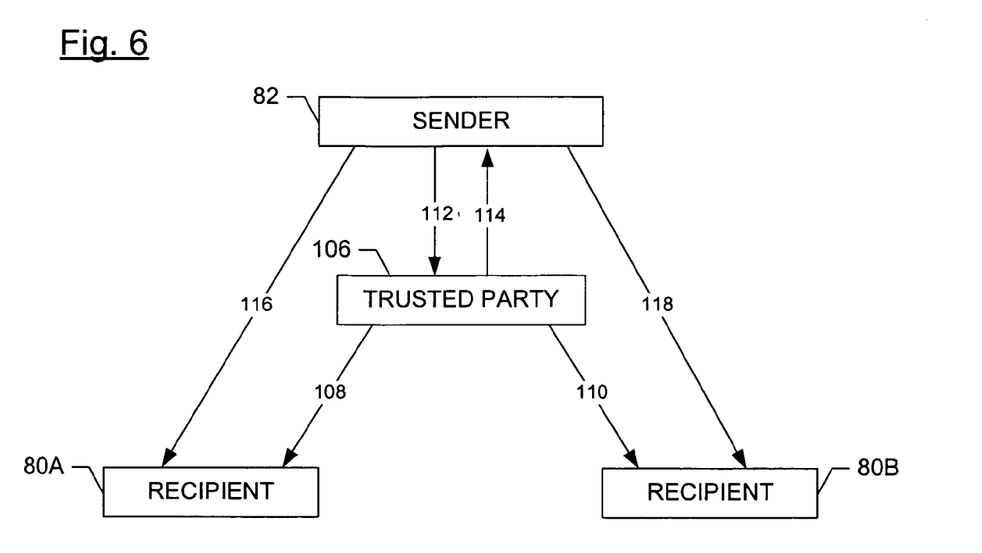
FIG. 6 is a functional block diagram illustrating the operation of using a trusted party for controlling receipt of a communication message by a recipient, in accordance with one embodiment of the invention.

Reference is now made to FIG. 6, which is a functional block diagram illustrating the operation of using a trusted party for controlling receipt of a communication message by a recipient, in accordance with one embodiment of the invention. In such an embodiment, a trusted party 106, such as an owner of an email domain, may authorize senders to send communication messages to a number of recipients, such as all recipients within the owner's email domain. For example, the information technology (IT) department of a corporation may be the domain owner for the corporation's email domain (e.g., xyzcorp.com), and all emails sent to any recipient in the domain (e.g., employee@xyzcorp.com) may need to be authorized by the IT department. In such an embodiment, the first level authorization certificate would typically not be a self-signed certificate from the recipient, as in the embodiments of FIGS. 4 and 5, but rather would be signed by the trusted party or domain owner. Such a certificate would typically contain the email domain rather than the email address of the recipient. This certificate would typically need to be downloaded from the trusted party to every recipient of the domain. As shown in FIG. 6, the trusted party 106 may receive a request, illustrated by line 112, from a sender 82 requesting authorization to send communication messages to recipients in the domain. The sender 82 would typically not request authorization to send messages to specific recipients, but rather would request authority to send messages to any recipient within the domain. In response to the request and upon authentication of the sender, the trusted party would typically send a capability certificate to the sender, as illustrated by line 114. The trusted party would also typically send the same capability certificates to recipient 80A, as illustrated by line 108, and to recipient 80B, as illustrated by line 110. Each recipient in the domain who may receive messages from the sender would typically need to receive the certificate that was sent to the sender to enable the recipient to verify the sender's authorization. After receiving the certificate from the trusted party 106, the sender 82 may send a communication message to recipient 80A, as illustrated by line 116, and/or to recipient 80B, as illustrated by line 118. An authorized sender would typically be able to send a message to any recipient in the domain by cryptographically binding the certificate to the message. The recipient may then verify the message using the information contained in the certificate sent from the trusted party to the recipient. Alternatively, the trusted party 106 could also perform the function of the gateway of FIG. 5. As such, in addition to authorizing senders to send communication messages to a number of recipients, the trusted party may verify that a message is from an authorized sender before delivering the message to the appropriate recipient.

Figure 7:
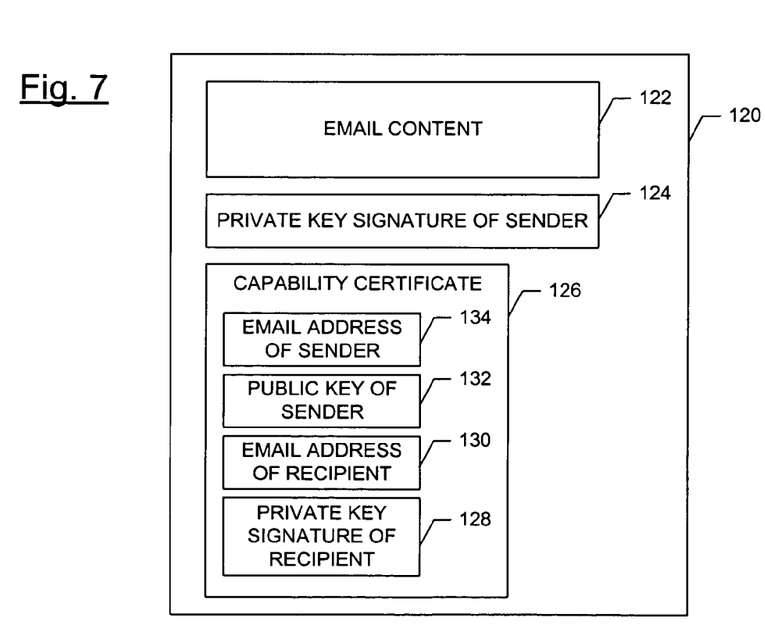
FIGS. 7-9 illustrate authorized communication messages, in accordance with embodiments of the invention.

As mentioned above, before the sender's communication message is received by the recipient, the recipient would typically verify that the communication message is from an authorized sender. The recipient may verify that the communication message is from an authorized sender by determining if the message is cryptographically bound to a capability certificate that was created by the recipient and that contains the communication identifier of the sender. The certificate may also contain the sender's public encryption key that the recipient may use to verify that the sender actually created the message. Referring now to FIG. 7, a communication message that may be verified is illustrated, according to one embodiment of the invention. FIG. 7 illustrates an email message 120 sent from a sender that received a capability certificate directly from the recipient. The capability certificate 126 is cryptographically bound to the message. The message also contains email content 122, such as text, and has a private key signature 124 of the sender. As discussed above, the recipient may verify that the communication message is from an authorized sender by determining if the message is cryptographically bound to a capability certificate that was created by the recipient and that contains the communication identifier of the sender. Capability certificate 126 cryptographically bound to email message 120 is illustrative of a capability certificate that would be created by a recipient to authorize a sender. Capability certificate 126 contains the recipient's email address 130 and the sender's email address 134. Capability certificate 126 also contains the sender's public key 132 that the recipient may use to verify the sender's encrypted signature 124. Capability certificate 126 also contains the recipient's encrypted signature 128, such that the recipient can verify that the recipient created this certificate.

Figure 8:
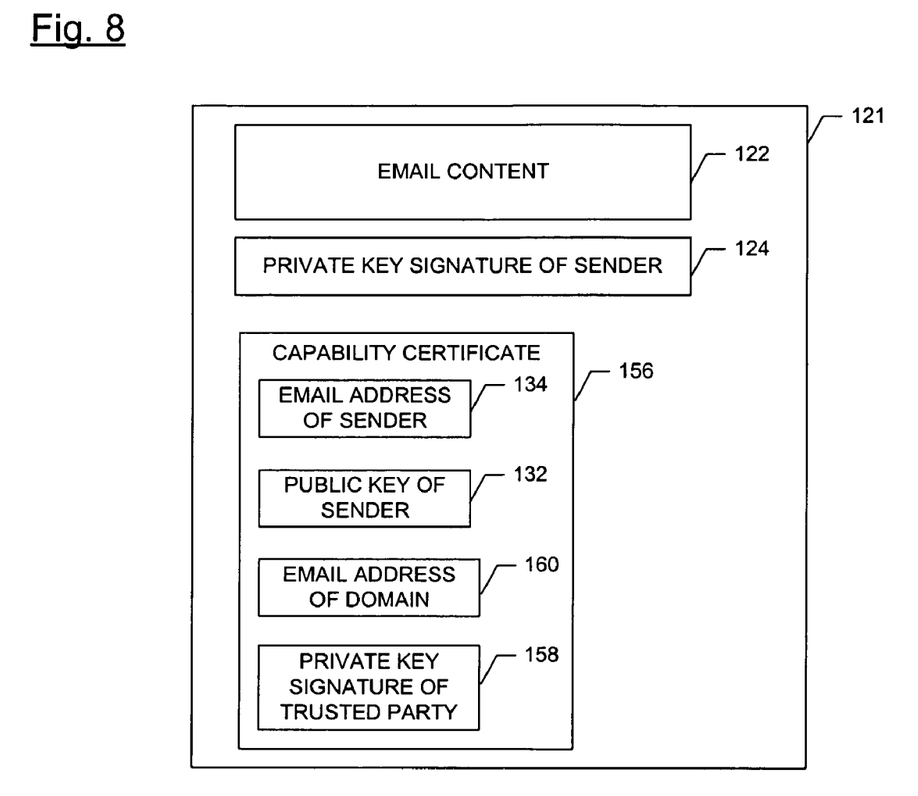

Referring now to FIG. 8, a communication message that may be verified is illustrated, according to one embodiment of the invention. FIG. 8 illustrates an email message 121 sent from a sender that received a capability certificate from a trusted party, as illustrated and described in FIG. 6. The capability certificate 156 is cryptographically bound to the message 121. Again, the message also contains email content 122, such as text, and has a private key signature 124 of the sender. The recipient may verify that the communication message is from an authorized sender by determining if the message is cryptographically bound to a capability certificate that was created by the trusted party and that contains the communication identifier of the sender. Capability certificate 156 cryptographically bound to email message 121 is illustrative of a capability certificate that would be created by a trusted party to authorize a sender. Capability certificate 156 contains the domain email address 160 and the sender's email address 134. Capability certificate 156 also contains the sender's public key 132 that the recipient may use to verify the sender's encrypted signature 124. Capability certificate 156 also contains the trusted party's encrypted signature 158, such that the recipient can verify that the trusted party created this certificate.

Alternatively, the recipient may verify that the communication message is from an authorized sender by determining if the message contains a capability certificate that was created by the authorizer and that contains the communication identifier of a sender. The recipient would also typically determine if the message contains a capability certificate that was created by the recipient and that contains the communication identifier of the authorizer. The recipient would then typically verify that there is an unbroken link of capability certificates from the recipient to the sender. Having an unbroken link of capability certificates typically means that the authorization of the recipient can be traced from the recipient through any authorizers to the sender, regardless of how many times authorization was performed before the original certificate was received by the sender. The transfer may be traced by verifying that the communication identifiers of both the recipient and of the first authorizer (i.e., the authorizer that received the original certificate, termed "Authorizer A") are in the original certificate, that the communication identifiers of both Authorizer A and of the next authorizer (i.e., the authorizer that received a certificate from Authorizer A, termed "Authorizer B") are in the certificate created by Authorizer A, that the communication identifiers of both Authorizer B and of the next authorizer (i.e., the authorizer that received a certificate from Authorizer B, termed "Authorizer C") are in the certificate created by Authorizer B, and so forth until the final authorizer (i.e., the authorizer that authorized the sender, termed "Authorizer X") is identified and it is verified that the final certificate contains the communication identifiers of both Authorizer X and of the sender. As above, the certificate may also contain the sender's public encryption key that the recipient may use to verify that the sender actually created the message.

Figure 9:
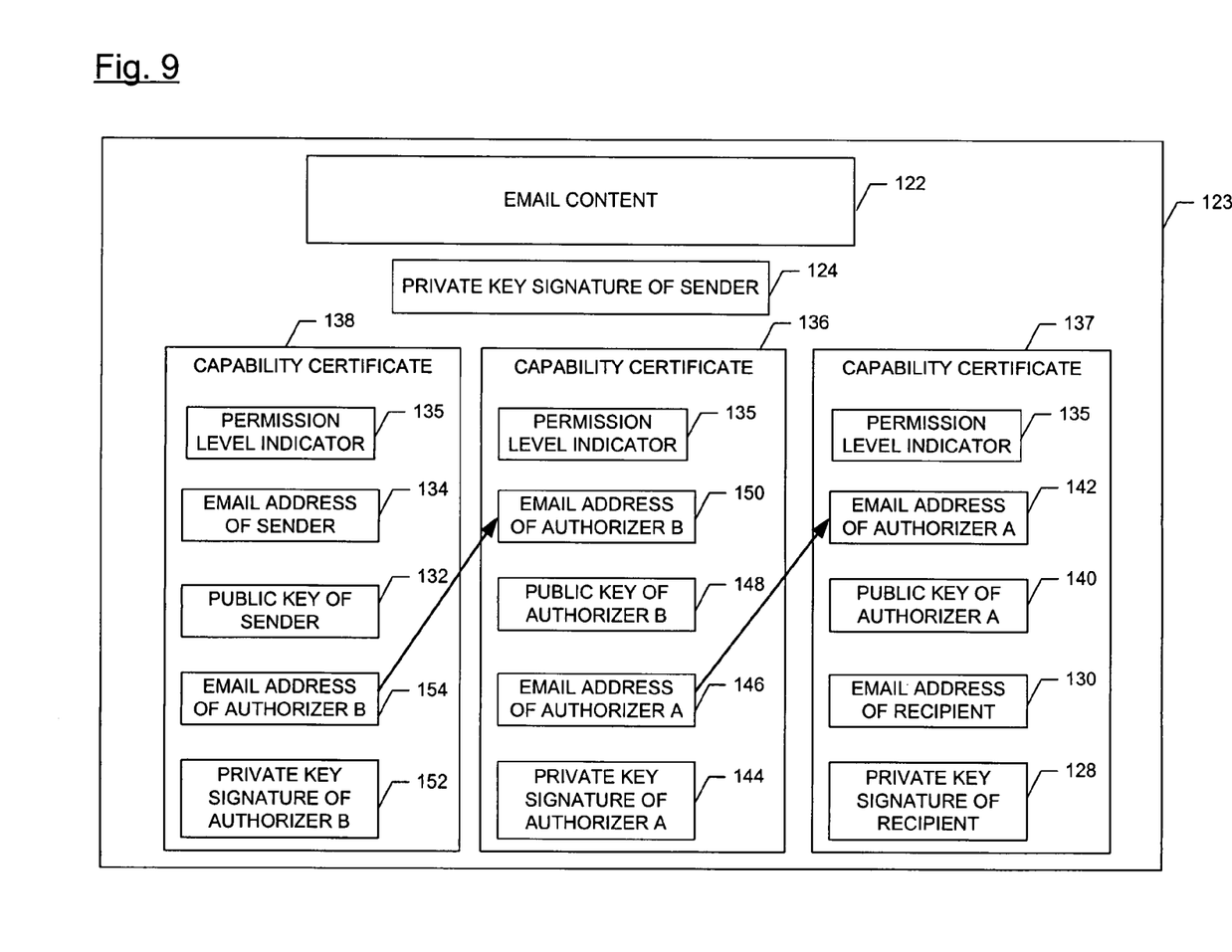

Referring now to FIG. 9, a communication message that may be verified is illustrated, according to one embodiment of the invention. FIG. 9 illustrates an email message 123 sent from a sender that received a capability certificate from an authorizer ("Authorizer B") who in turn received a certificate from another authorizer ("Authorizer A"), who in turn received a certificate from the recipient. Capability certificate 137 is illustrative of a capability certificate created by the recipient and sent to Authorizer A. Capability certificate 137 is similar to capability certificate 126 of FIG. 7, except that certificate 137 has the email address 142 and the public key 140 of Authorizer A, rather than of the sender. As certificate 137 was created by the recipient, certificate 137 has the recipient's email address 130 and private key signature 128. Capability certificate 137 also has a permission level indicator 135 which, as discussed above, enables the recipient to inform Authorizer A whether or not Authorizer A has permission to authorize other senders and/or to authorize other authorizers.

Capability certificate 136 is illustrative of a capability certificate created by Authorizer A and sent to Authorizer B. When Authorizer A sent certificate 136 to Authorizer B, Authorizer A would typically also send certificate 137 to Authorizer B. Capability certificate 136 has the email address 150 and the public key 148 of Authorizer B. As certificate 136 was created by Authorizer A, certificate 136 has Authorizer A's email address 146 and private key signature 144. Capability certificate 136 also has a permission level indicator 135 which, as discussed above, enables Authorizer A to inform Authorizer B whether or not Authorizer B has permission to authorize other senders and/or to authorize other authorizers.

Capability certificate 138 is illustrative of a capability certificate created by Authorizer B and sent to the sender. When Authorizer B sent certificate 138 to the sender, Authorizer B would typically also send certificate 137 and certificate 136 to the sender. Capability certificate 138 has the sender's email address 134 and public key 132. As certificate 138 was created by Authorizer B, certificate 138 has Authorizer B's email address 154 and private key signature 152. Capability certificate 138 also has a permission level indicator 135 which, as discussed above, enables Authorizer B to inform the sender whether or not the sender has permission to authorize other senders and/or to authorize other authorizers.

Capability certificate 138 would typically be cryptographically bound to the communication message 123, while capability certificates 137, 136 may be simply attached to or embedded in the message. Again, the message also contains email content 122, such as text, and has a private key signature 124 of the sender. The recipient may verify that the communication message is from an authorized sender by determining if the message contains a capability certificate that was created by the recipient and that contains the communication identifier of an authorizer. Message 123 contains certificate 137 which was created by the recipient and contains the communication identifier of Authorizer A. The recipient would also typically determine if the message is bound to a capability certificate that was created by an authorizer and that contains the communication identifier of the sender. Message 123 also is bound to certificate 138 which was created by Authorizer B and contains the communication identifier of the sender. The recipient would then typically verify that there is an unbroken link of capability certificates from the recipient to the sender. The arrows in FIG. 9 illustrate the unbroken link of capability certificates from the sender (by certificate 138), through certificate 136, to the recipient (by certificate 137).

The recipient may also compare the communication identifiers of the sender and every authorizer in the link of capability certificates to a black list. The black list may define the communication identifiers of senders who have previously sent unwanted messages to the recipient, as well as the communication identifiers of authorizers who have previously authorized senders who then sent unwanted messages to the recipient. The recipient may not accept delivery of a communication message if the communication identifier of the sender, or of one of the authorizers, is on the black list. In the illustration of FIG. 9, the recipient would typically determine if the sender's email address 134, Authorizer B's email address 150, or Authorizer A's email address 142 is on the black list and, if so, would not receive message 123.

The method of controlling receipt of a communication message by a recipient may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the processing element of the server.

In this regard, FIGS. 4-6 and the corresponding description above illustrate methods and program products according to embodiments of the invention. It will be understood that each step, and combinations of steps, illustrated in FIGS. 4-6 and described above can be implemented by computer program instructions. These computer program instructions may be loaded onto one or more computers or other programmable apparatus to produce a machine, such that the instructions which execute on the computer or other programmable apparatus create means for implementing the functions illustrated in FIGS. 4-6 and described above. These computer program instructions may also be stored in a computer-readable memory that can direct a computer or other programmable apparatus to function in a particular manner, such that the instructions stored in the computer-readable memory produce an article of manufacture including instruction means which implement the function illustrated in FIGS. 4-6 and described above. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions illustrated in FIGS. 4-6 and described above.

Accordingly, steps illustrated in FIGS. 4-6 and described above support combinations of means for performing the specified functions, combinations of steps for performing the specified functions and program instruction means for performing the specified functions. It will also be understood that each step illustrated in FIGS. 4-6 and described above, and combinations of steps illustrated in FIGS. 4-6 and described above, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to perform at least the following:
   determine if a communication message from a sender device to the apparatus is cryptographically bound at least a first capability certificate and a second capability certificate;
   determine if the first and second capability certificates are signed using a private encryption key by at least one of a recipient and a trusted party that is independent from the sender device and the apparatus;
   determine if an unbroken link exists between the first capability certificate and the second capability certificate that are determined as signed by at least one of the apparatus and the trusted party; and
   receive the communication message when the communication message is cryptographically bound to the first and second capability certificates, when the unbroken link exists between the first and second capability certificate, and when a determination reveals that the apparatus created the first capability certificate and the trusted party created the second capability certificate,
   wherein each of the capability certificates includes a permission level indicator, and the indicator indicates at least three permission levels: a permission level (1) using a certificate only to send messages to a recipient but not to grant permission to other parties to send messages to the recipient, a permission level (2) using the certificate to grant permission to other parties to send messages to the recipient, but not to authorize the other parties to authorize additional parties, and a permission level (3) using the certificate to grant permission to other parties to authorize additional parties to send messages to the recipient.

2. The apparatus of claim 1, wherein the apparatus determines if the communication message is cryptographically bound to at least the first and second capability certificates by determining if the communication message is signed at the sending device using a private encryption key of a sender.

3. The apparatus of claim 1, wherein the apparatus is further caused to determine if a signer of the capability certificates in the communication message is listed on a blacklist.

4. The apparatus of claim 1, wherein the apparatus is further caused to:
   receive an authorization request from a sender of the sender device, the authorization request signed by the sender using a private encryption key of the sender;
   define a communication identifier of a recipient of the apparatus, a communication identifier of the sender, and a public key of the sender; and
   send the first capability certificate to the sender in response to the authorization request, the first capability certificate signed by the recipient using a private encryption key of the recipient and defining the communication identifier of the recipient and the communication identifier of the sender.

5. The apparatus of claim 4, wherein the first capability certificate further defines a forwarding authorization that indicates whether the sender is authorized to sign a capability certificate of a second sender such that the recipient will receive a communication message sent from the second sender.

6. A method comprising:
   determining if a communication message from a sender device to a recipient device is cryptographically bound to at least a first capability certificate and a second capability certificate;
   determining if the first and second capability certificates are signed using a private encryption key by at least one of the recipient device and a trusted party that is independent from the sender device and the recipient device;
   determining if an unbroken link exists between the first capability certificate and the second capability certificate that are determined as signed by at least one of the recipient device and the trusted party; and
   receiving, at the recipient device, the communication message when the communication message is cryptographically bound to the first and second capability certificates, when the unbroken link exists between the first and second capability certificate, and when a determination reveals that the recipient device created the first capability certificate and the trusted party created the second capability certificate,
   wherein each of the capability certificates includes a permission level indicator, and the indicator indicates at least three permission levels: a permission level (1) using a certificate only to send messages to a recipient but not to grant permission to other parties to send messages to the recipient, a permission level (2) using the certificate to grant permission to other parties to send messages to the recipient, but not to authorize the other parties to authorize additional parties, and a permission level (3) using the certificate to grant permission to other parties to authorize additional parties to send messages to the recipient.

7. The method of claim 6, wherein determining if the communication message is cryptographically bound to at least the first and second capability certificates comprises determining if the communication message is signed at the sending device using a private encryption key of a sender.

8. The method of claim 6, wherein the method further comprises: determining if a signer of the capability certificates in the communication message is listed on a blacklist.

9. The method of claim 6, wherein the method further comprises:
  receiving an authorization request from a sender of the sender device, the authorization request signed by the sender using a private encryption key of the sender and defining a communication identifier of a recipient of the recipient device, a communication identifier of the sender, and a public key of the sender; and
  sending the first capability certificate to the sender in response to the authorization request, the first capability certificate signed by the recipient using a private encryption key of the recipient device and defining the communication identifier of the recipient and the communication identifier of the sender.

10. The method of claim 9, wherein the first capability certificate further defines a forwarding authorization that indicates whether the sender is authorized to sign a capability certificate of a second sender such that the recipient device will receive a communication message sent from the second sender.

11. The method of claim 6, wherein the method further comprises:
  receiving an authorization request from a sender of the sender device, the authorization request signed by the sender using a private encryption key of the sender and defining a communication identifier of a domain, a communication identifier of the sender, and a public key of the sender; and
  sending the first capability certificate to the sender and to the recipient device in response to the authorization request, the first capability certificate defining the communication identifier of the domain and the communication identifier of the sender.

12. A computer-readable storage medium carrying one or more sequences of one or more instructions which, when executed by one or more processors, cause an apparatus to at least perform the following steps:
  determining if a communication message from a sender device to the apparatus is cryptographically bound at least a first capability certificate and a second capability certificate;
  determining if the first and second capability certificates are signed using a private encryption key by at least one of the apparatus and a trusted party that is independent from the sender device and the apparatus;
  determining if an unbroken link exists between the first capability certificate and the second capability certificate that are determined as signed by at least one of the apparatus and the trusted party; and
  receiving the communication message when the communication message is cryptographically bound to the first and second capability certificates, when the unbroken link exists between the first and second capability certificate, and when a determination reveals that the apparatus created the first capability certificate and the trusted party created the second capability certificate,
  wherein each of the capability certificates includes a permission level indicator, and the indicator indicates at least three permission levels: a permission level (1) using a certificate only to send messages to a recipient but not to grant permission to other parties to send messages to the recipient, a permission level (2) using the certificate to grant permission to other parties to send messages to the recipient, but not to authorize the other parties to authorize additional parties, and a permission level (3) using the certificate to grant permission to other parties to authorize additional parties to send messages to the recipient.

13. The computer-readable storage medium of claim 12, wherein the apparatus determines if the communication message is cryptographically bound to at least the first and second capability certificates comprises by determining if the communication message is signed at the sending device using a private encryption key of a sender.

14. The computer-readable storage medium of claim 12, wherein the apparatus is caused to further perform:
  causing receipt of an authorization request from a sender of the sender device, the authorization request signed by the sender using a private encryption key of the sender and defining a communication identifier of a recipient of the apparatus, a communication identifier of the sender, and a public key of the sender; and
  causing the first capability certificate to be sent to the sender in response to the authorization request, the first capability certificate signed by the recipient using a private encryption key of the apparatus and defining the communication identifier of the recipient and the communication identifier of the sender.

* * * * *